United States Patent [19]

Nixon

[11] Patent Number: 4,476,820

[45] Date of Patent: Oct. 16, 1984

[54] ENGINE COMPARTMENT STRUCTURE

[76] Inventor: John Nixon, 11795 E. Grand River, Brighton, Mich. 48116

[21] Appl. No.: 404,319

[22] Filed: Aug. 2, 1982

Related U.S. Application Data

[63] Continuation-in-part of Ser. No. 281,008, Jul. 6, 1981, abandoned.

[51] Int. Cl.³ .............................................. F01P 7/10
[52] U.S. Cl. .............................. 123/41.05; 123/41.06; 123/41.59; 123/195 C
[58] Field of Search .................... 133/41.04–41.06, 133/41.58, 41.59, 41.6, 41.62, 41.7, 195 C; 236/35.2; 180/69 R

[56] References Cited

U.S. PATENT DOCUMENTS

| | | | |
|---|---|---|---|
| 1,257,219 | 2/1918 | Griswold | 123/41.58 |
| 1,351,477 | 8/1920 | Hodges | 123/41.05 |
| 1,873,379 | 8/1932 | Frentzel, Jr. | 123/41.58 |
| 2,109,633 | 3/1938 | Cross | 123/41.59 |
| 2,164,545 | 7/1939 | Rodgers | 123/41.59 |
| 2,913,065 | 11/1959 | Lyon, Jr. | 123/41.06 |
| 3,166,052 | 1/1965 | Parsons | 123/41.05 |
| 4,226,217 | 10/1980 | Haslbeck et al. | 123/41.62 |

Primary Examiner—William A. Cuchlinski, Jr.
Attorney, Agent, or Firm—Gifford, VanOphem, Sheridan, Sprinkle & Nabozny

[57] ABSTRACT

A method of regulating the engine compartment temperature by opening shutters and operating blower(s) and radiator cooling fan to provide air flow through the compartment to maintain a minimum temperature. The enclosed engine compartment provides for rapid heat up of engine and the crankcase, supplies heated inducted air into the engine and aerodynamically shapes the forward of the engine enclosure. A sloped shroud at the front of the engine compartment also enhances the cooling efficiency of the radiator.

16 Claims, 10 Drawing Figures

ENGINE COMPARTMENT STRUCTURE

CROSS REFERENCE TO RELATED APPLICATION

This application is a continuation-in-part of patent application Ser. No. 281,008, entitled ENGINE COMPARTMENT STRUCTURE, filed on July 6, 1981 and now abandoned.

BACKGROUND OF THE INVENTION

I. Field of the Invention

The present invention relates to an engine compartment environment control mechanism.

II. Description of the Prior Art

The rapid heat up and the maintaining of the heat generated by an automobile engine in the winter months in northern climates is a problem. The heat loss from the engine seriously affects the operating efficiency of the engine.

Conventional automobiles have no provision for maintaining an elevated engine compartment temperature, although on some motor vehicle engines shutters are provided for controlling the radiator air flow.

The usual method of controlling the engine heat is by regulation of the coolant flow by a thermostat located in the engine coolant outlet connected to a radiator and fan for heat transfer. This method controls the heat of the engine jacket, but the crankcase and oil pan are subjected to the ambient temperature. In many automobile designs, the oil pan is mounted at the level of the lowest structural member.

The method of controlling heat transfer by shutters on the radiator presents a flat vertical surface to the air flow which affects operating efficiency.

SUMMARY OF THE PRESENT INVENTION

The present invention provides a unique means for rapidly heating the engine compartment and thereafter maintaining the engine compartment temperature between an upper and lower limit.

According to the present invention, conventional engines may be modified by removing the engine driven cooling fan and providing a separately mounted electric motor driven cooling fan, which is operated only when the radiator temperature is at the desired operating temperature. The engine compartment is completely enclosed and the front of the engine compartment is sloped at an angle of about 45° depending on the available space. The lower portion of the compartment is constructed of a pliable material which extends below the the front wheel structure and just below the level of the front bumper. The front of the engine compartment extends upwards to within one inch of the compartment hood when in the closed position. The front sloped engine compartment also meets the inside of the wheel mud guards. The underside of the engine is completely enclosed by a horizontal plate running from the front sloped cover to the firewall. A half inch space is allowed between the underplate and the underside of the oil pan for air circulation and engine movement. All through holes in the plate are sealed with high temperature flexible seals, i.e., the through holes for the exhaust pipes, coolant hoses, and the like. A removable cover allows access to the oil pan drain plug. Temperature operated shutters are placed in the front sloped cover of the engine compartment.

A duct in the underside of the hood carries the air deflected by the sloped front out to the rear of the hood to be deflected by the windshield. A temperature operated shutter is positioned between the hood duct and the firewall which prevents air flow from the engine compartment. The exhaust manifolds are enclosed and an electrically operated blower circulates the heat generated by the engine exhaust out through the bottom of the enclosure, under the oil pan and this air flows throughout the engine compartment. An opening in the top of the manifold enclosure connects inducted air to the engine. The exhaust manifold blowers are temperature controlled and switch on when the engine is running and the enclosure temperature is high and switch off when the engine compartment is at operating temperature.

With a cool engine, air passes through the radiator and is deflected upwards by the sloping front of the engine compartment. The air flow enters the duct on the underside of the engine compartment hood and flows out and onto the front of the windshield.

The exhaust manifold blowers is actuated and circulates warm air under the oil pan and through the engine compartment. As the engine heats up, its temperature increases to the point where the thermostat opens and allows circulation of the coolant through the engine. Simultaneously, the radiator cooling fan switches on.

When the temperature in the engine compartment reaches about 100° F., the exhaust manifold blowers are deactivated. With a further increase in compartment temperature the rear shutter situated at the firewall and hood opens completely to allow unrestricted air flow out of the engine compartment.

A further temperature increase to 110° F. will modulate open the shutters in the front of the engine compartment cover. The shutter blades open downwardly thus deflecting air flow from the fan, through the radiator, into the engine compartment, onto the engine and out through the rear shutter.

With a still higher ambient temperature, resulting in an underhood engine compartment temperature in excess of 110° F., all shutters open fully to allow for maximum cooling.

BRIEF DESCRIPTION OF THE DRAWINGS

A better understanding of the present invention will be had upon reference to the following detailed description when read in conjunction with the accompanying drawings, wherein like reference characters refer to like parts throughout the several views, and in which.

DETAILED DESCRIPTION OF A PREFERRED EMBODIMENT OF THE INVENTION

Figure 1:
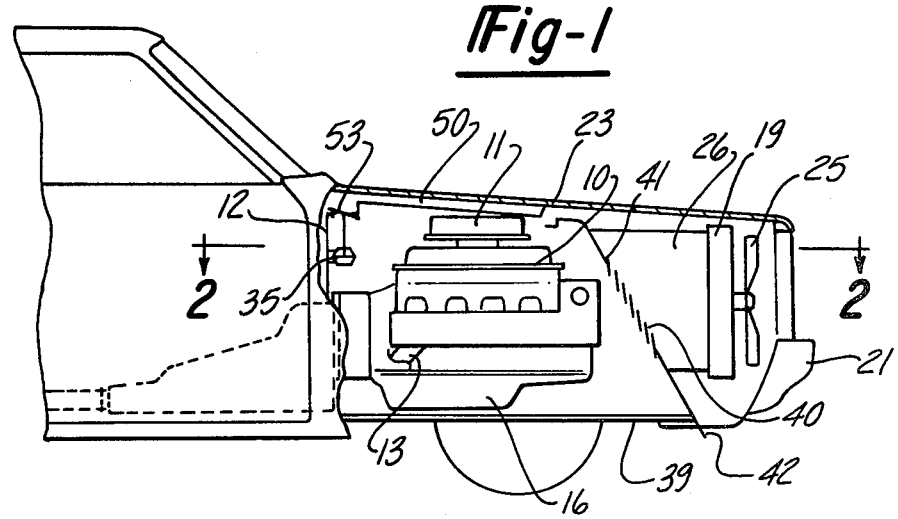
FIG. 1 is a side view of the preferred embodiment of the invention.
Figure 2:
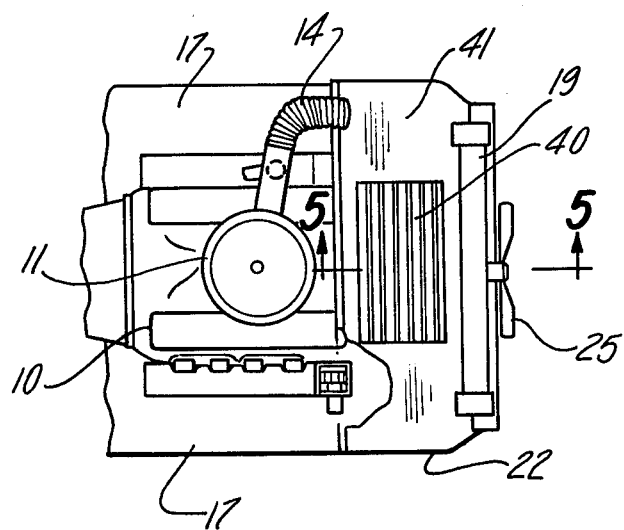
FIG. 2 is a sectional view taken substantially along line 2—2 in FIG. 1.
Figure 4:
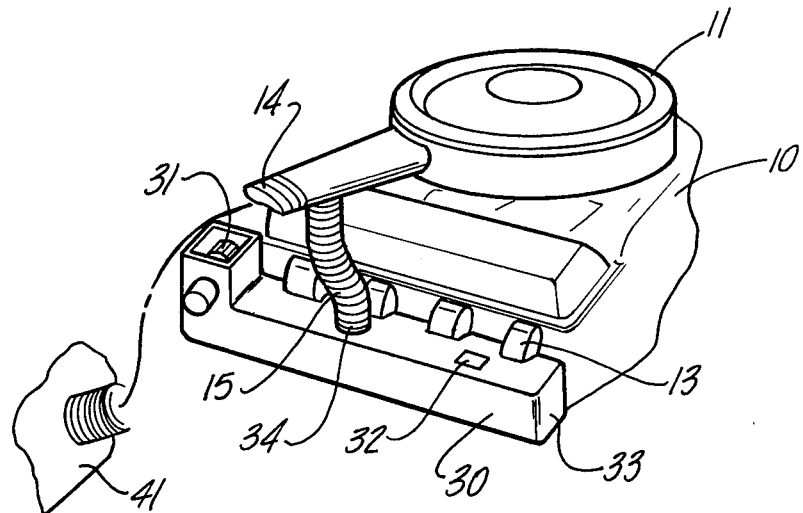
FIG. 4 is an elevational view illustrating a portion of the preferred embodiment.

The climatic control apparatus of the present invention can be used in conventional automobiles or motor vehicles. As best shown in FIGS. 1, 2 and 4, a conventional water cooled internal combustion engine 10 is thereshown with air intake filter 11, a fresh induction air snorkle tube 14, a heated air intake tube 15, an exhaust manifold 13, an oil pan 16 and a radiator 19. The engine is situated between two wheel covers or fenders 17 and a firewall 12. These components are all conventional in construction and, therefore, further description is unnecessary.

The engine 10 is contained in a compartment defined in part by a base plate 39, a front sloped plate 41 containing a shutter 40, and a flexible portion which extends below the level of the front bumper 21. Four equally spaced small holes are provided in the base plate 39 for drainage and the plate 39 is removable for cleaning and maintenance. The top part of the engine compartment is closed by a hood 23 which contains a duct 50 securely fitted to its underside. An electrically operated radiator fan 25 is positioned in front of radiator 19 and, when operating, will blow air through the radiator 19 guided by shroud 26. The fan 25 thus enhances the heat transfer from the radiator 19 and also from the engine compartment.

Figure 3:
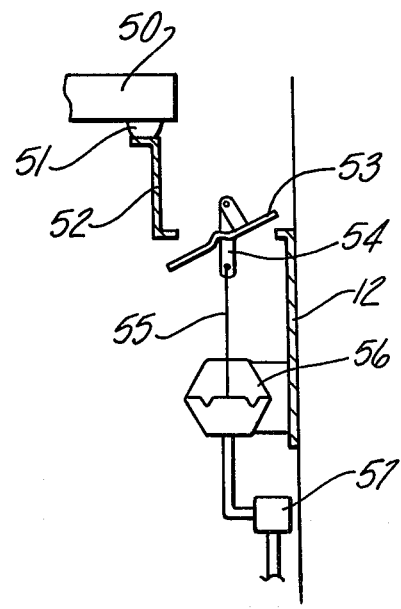
FIG. 3 is an enlarged view of the mechanism operating the rear engine compartment shutter.

As best shown in FIG. 4, each manifold 13 is enclosed by a metal housing 30 which contains an electrically operated fan 31 and a thermostat 32. As best shown in FIGS. 1 and 3, a shutter 53 is situated between the hood duct 50 and the firewall 12, to selectively close the opening for the exhausted air between the hood duct and firewall.

With reference back to FIGS. 1 and 2, the front plate 41 is securely attached to the automobile frame structure 22, and to the right and left wheel covers 14 but can be removed for maintenance on the engine as required.

Figure 7:
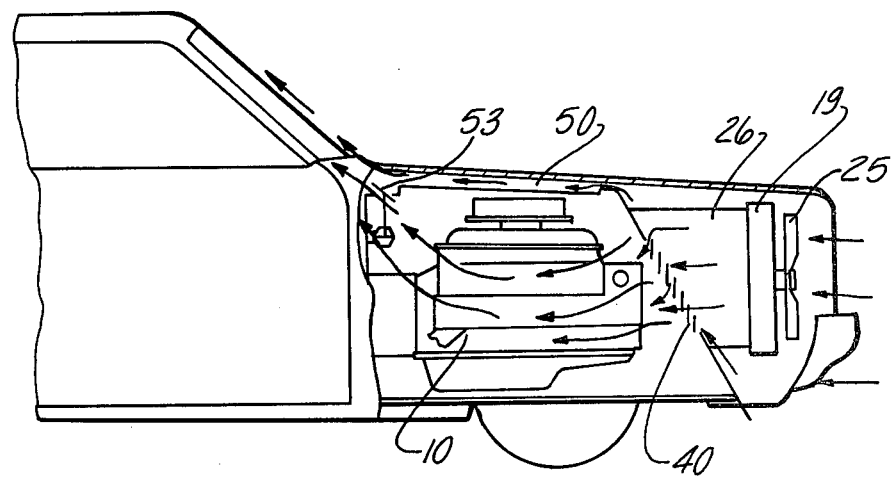
FIG. 7 is a second flow diagram with the engine compartment at a temperature of about 100° F.

As best shown in FIGS. 4 and 7, after starting a cold automobile engine, the exhaust manifold duct rapidly will heat up and trip the thermostat 32 which switches on the blower 31, the blower 31 inducts air flow through the manifold cover 30, past the exhaust manifold 13 and out through the cover opening 33 to circulate the warm air through the engine compartment. A connection 34 attaches the engine inducted air tube 15 to the cover 30 thus replacing the conventional engine stove connection.

The hot air from the cover opening 33 circulates through the engine compartment and eventually raising the engines compartment temperature to about 100° F. At this temperature the thermostat 35, situated on the firewall will switch off the exhaust manifold blower 31.

Figure 6:
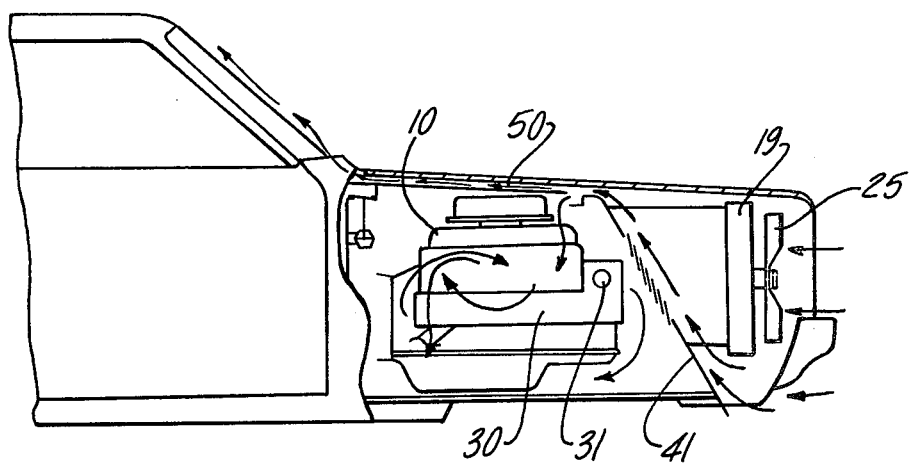
FIG. 6 is a first flow diagram denoting the air flow with a cold engine.

With the automobile moving in a forward direction air passes through the radiator 19 and impinges on the front sloped cover 41. This air then deflects upwardly, passes through duct 50, and out of the engine compartment in front of the windshield. At this time, the air required for engine consumption is inducted primarily through the gap between plate 41 and the underduct 50. In addition, the louvers of the shutter 40 would be fully closed at this point. In addition, as shown in FIG. 6, at this time the heated air from the manifold cover 30 recirculates in the engine compartment.

As best shown in FIGS. 3 and 7, as the engine compartment temperature increases above 100° F., a temperature switch 57 connected to a vacuum source opens and operates vacuum motor 56. The motor 56 retracts a rod 55 which, through a lever 54, opens the shutter 53 with respect to its housing 52 which is sealed by a gasket 51 to the hood duct 50. At this time, a full vacuum is applied to the motor 56 and the shutter 53 fully opens. At this time, however, the shutter 40 remains closed. The open shutter 53 permits some escape of heat from the engine compartment due to air leakage into the compartment.

Figure 5:
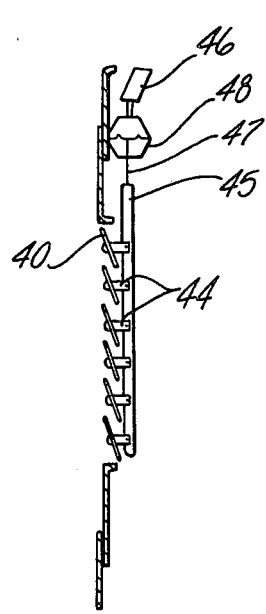
FIG. 5 is a sectional view taken along line 5—5 in FIG. 2.

As best shown in FIGS. 5 and 7, as the engine compartment temperature increases to 110° F., the louvers on shutter 40 which are temperature controlled by the vacuum switch 46 open. The vacuum switch 46 modulates the operation of a vacuum motor 48, to control the relative degree of opening of the louvers in shutter 40. This operation occurs through a linkage 44 which is attached to the shaft of the louvers via a link 45 and shaft 47, to provide motion to open the shutter.

With the automobile in a forward motion the air passes through the relatively cool radiator 19, impinges on the partially opened louvers of shutter 40 and is deflected into the engine compartment. This air ultimately exhausts around the shutter 53.

Figure 8:
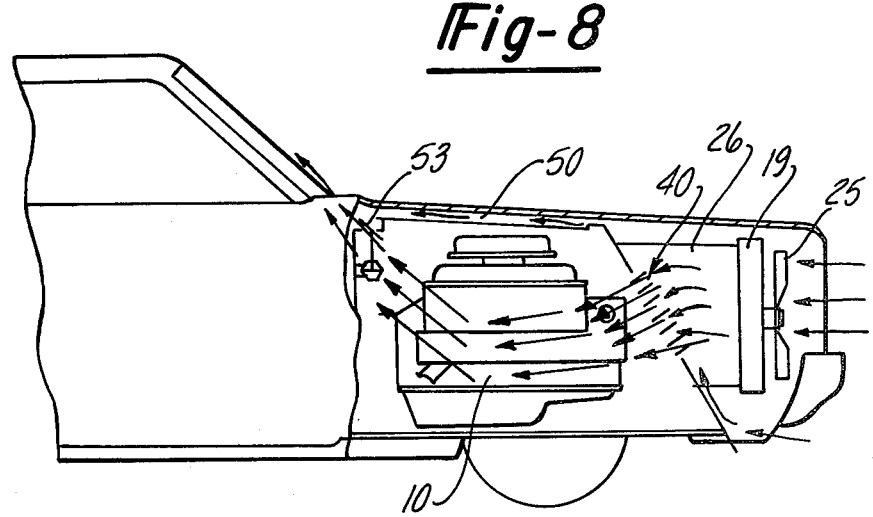
FIG. 8 is a third flow diagram with a hot engine.

As best shown by FIG. 8, should the engine compartment temperature continue to increase, the louvers on shutter 40 completely open and the fan 25 is activated to increase the transfer of heat from the engine compartment. The fan 25 is also controlled by the engine temperature in the conventional manner to control the engine temperature.

Figure 9:
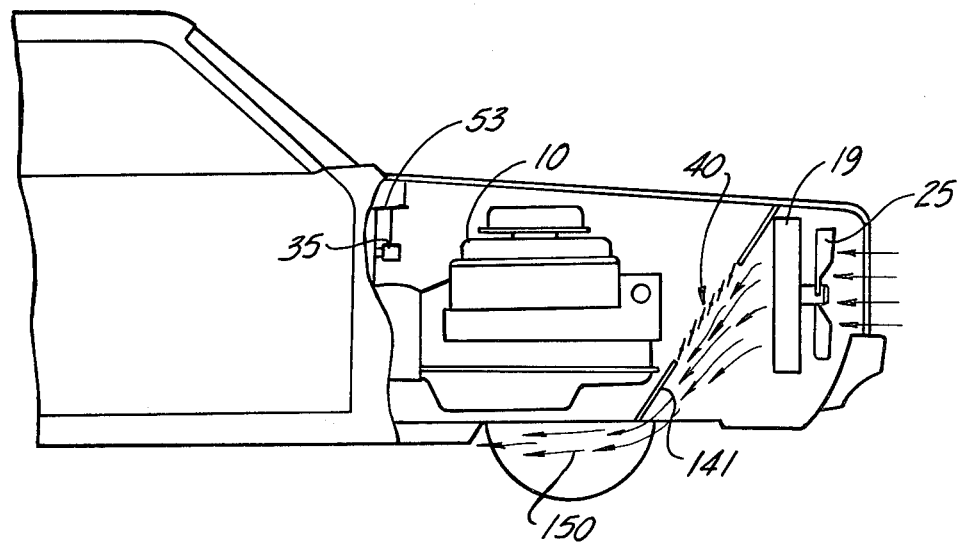
FIG. 9 is a view similar to FIG. 6 but showing a second preferred embodiment.
Figure 10:
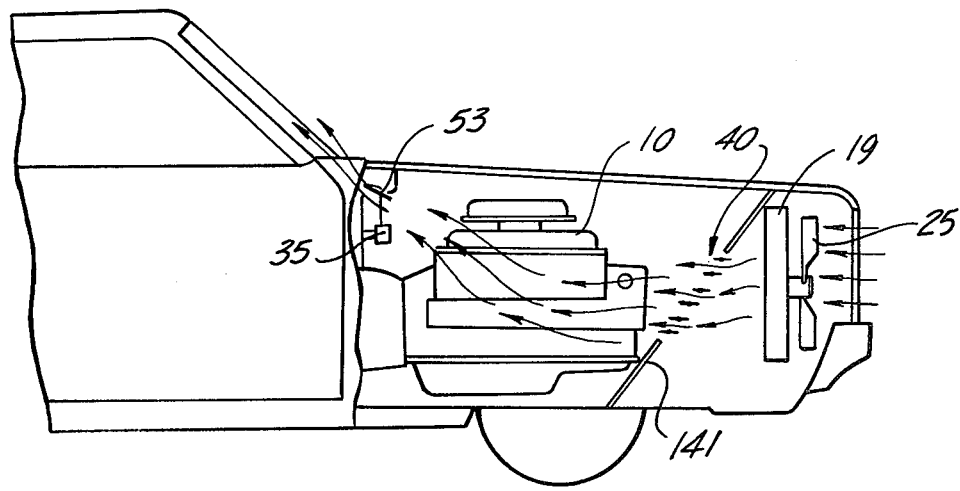
FIG. 10 is a view similar to FIG. 8 but showing the second preferred embodiment of the invention.

With reference now to FIGS. 9 and 10, a second preferred embodiment of the present invention is thereshown. The second preferred embodiment is substantially the same as the first preferred embodiment except that a front sloped plate 141 containing the shutter 40 is positioned in the front of the engine compartment. Unlike the sloped plate 41 shown in FIGS. 7 and 8, the sloped plate 141 is angled upwardly and forwardly from the bottom of the engine compartment. Consequently, with the shutter 40 in its closed position (FIG. 9), the sloped plate 141 together with the shutter 40 deflect the oncoming air downwardly underneath the vehicle as shown by arrows 150. As before, the shutter 40 variably opens (FIG. 10) in dependence upon the engine compartment temperature to circulate air into and through the engine compartment.

The upwardly and forwardly angled sloped plate 141 is advantageous in three important respects. First, the sloped plate, by deflecting air downwardly under the vehicle, inverts the normal build up of low pressure above the vehicle with respect to its underside at high vehicle speeds. This in turn produces a slight downward force on the vehicle, commonly known as ground effect, so that the vehicle "hugs" the road.

Secondly, the sloped plate 141 produces better access to the engine components in the engine compartment than is obtainable with the rearwardly sloped plate 41.

Lastly, the forwardly sloped plate eliminates the need for the duct 50 along the top of the engine.

From the foregoing, it can be seen that the present invention provides unique means for rapidly heating and thereafter controlling the engine compartment temperature. The rapid heat up of the engine compartment as well as maintaining the engine compartment with predefined limits improves the engine efficiency in different climatic conditions, particularly when used with the engine efficiency device of my copending patent application. Having described my invention, however, many modifications thereto will become apparent to those skilled in the art to which it pertains without deviation from the spirit of the invention as defined by the scope of the appended claims.

I claim:

1. For use in conjunction with a vehicle having an engine compartment having a forward and rearward end and in which an engine is contained, a device for maintaining the temperature of the engine compartment between predetermined upper and lower limits comprising:

means for substantially enclosing said engine in said engine compartment, means for recirculating air within the engine compartment whenever the temperature of the engine compartment is less than said lower limit, said enclosing means comprising a shutter assembly positioned forwardly of the engine, said shutter assembly being movable between a closed position in which air flow through said shutter assembly is substantially blocked, and an open position in which exterior air flows into and through the engine compartment, means for variably moving said shutter assembly from its closed position and towards its open position as said engine compartment temperature increases above said upper limit and wherein said shutter assembly lies in a forwardly angled plane with respect to the vehicle so that, when in its closed position, said shutter assembly deflects incoming air underneath the vehicle.

2. The invention as defined in claim 1 wherein said moving means variably opens said shutter assembly in an amount proportional to the engine compartment temperature.

3. The invention as defined in claim 1 wherein a hood covers the top of the engine compartment, said hood having a duct open at one end to the side of the shutter assembly opposite from the engine compartment and open at its other end exteriorly of the vehicle.

4. The invention as defined in claim 1 and further comprising a second shutter assembly at the rearward end of the engine compartment and movable between an open and closed position, and means for moving said second shutter assembly to its open position when the engine compartment temperature is greater than said lower limit.

5. The invention as defined in claim 1 wherein the engine includes an exhaust manifold and wherein said recirculating means comprises a housing positioned around the exhaust manifold and forming a chamber therebetween, said housing being open at each end, and a fan mounted to one end of said housing which, upon activation, inducts air into said chamber.

6. The invention as defined in claim 1 and further comprising a radiator positioned forwardly of said shutter assembly and fan means for blowing air through the radiator positioned forwardly of the radiator.

7. The invention as defined in claim 6 wherein the fan means is electrically powered.

8. The invention as defined in claim 1 wherein the enclosing means comprises a base plate extending underneath the engine.

9. For use in conjunction with a vehicle having an engine compartment having a forward and rearward end and in which an engine is contained, a device for maintaining the temperature of the engine compartment between predetermined upper and lower limits comprising:

means for substantially enclosing said engine in said engine compartment, means for recirculating air within the engine compartment whenever the temperature of the engine compartment is less than said lower limit, said enclosing means comprising a first shutter assembly and a second shutter assembly, means for opening said second shutter when said engine compartment temperature increases above said lower limit to thereby vent the engine compartment, said first shutter assembly positioned forwardly of the engine, said first shutter assembly being movable between a closed position in which air flow through said first shutter assembly is substantially blocked, and an open position in which exterior air flows through said first shutter assembly and into and through the engine compartment, means for variably moving said first shutter assembly from its closed position and towards its open position as said engine compartment temperature increases above said upper limit.

10. The invention as defined in claim 9 wherein said moving means variably opens said first shutter assembly in an amount proportional to the engine compartment temperature.

11. The invention as defined in claim 9 wherein a hood covers the top of the engine compartment, said hood having a duct open at one end to the side of the first shutter assembly opposite from the engine compartment and open at its other end exteriorly of the vehicle.

12. The invention as defined in claim 11 wherein said first shutter assembly lies in a rearwardly angled plane with respect to the vehicle so that, when in its closed position, said first shutter assembly deflects incoming air towards said hood duct.

13. The invention as defined in claim 11 wherein said first shutter assembly lies in a forwardly angled plane with respect to the vehicle so that, when in its closed position, said first shutter assembly deflects incoming air underneath the vehicle.

14. The invention as defined in claim 11 and further comprising a radiator positioned forwardly of said first shutter assembly and fan means for blowing air through the radiator positioned forwardly of the radiator.

15. The invention as defined in claim 14 wherein the fan means is electrically powered.

16. The invention as defined in claim 9 wherein the enclosing means comprises a base plate extending underneath the engine.

* * * * *

UNITED STATES PATENT AND TRADEMARK OFFICE
CERTIFICATE OF CORRECTION

PATENT NO. : 4,476,820
DATED : October 16, 1984
INVENTOR(S) : John Nixon

It is certified that error appears in the above—identified patent and that said Letters Patent is hereby corrected as shown below:

Column 1, line 53 delete "the" (Second occurrence).

Column 3, line 11 delete "snorkle" and insert --snorkel--.

Signed and Sealed this

Twenty-fifth Day of June 1985

[SEAL]

*Attest:*

DONALD J. QUIGG

*Attesting Officer*  Acting Commissioner of Patents and Trademarks